(12) United States Patent
Jennings et al.

(10) Patent No.: US 10,232,971 B2
(45) Date of Patent: Mar. 19, 2019

(54) MEASURING AND DISPENSING CONTAINER

(71) Applicants: Robert M. Jennings, Oldwick, NJ (US); David A. Jennings, Mountainside, NJ (US)

(72) Inventors: Robert M. Jennings, Oldwick, NJ (US); David A. Jennings, Mountainside, NJ (US)

( * ) Notice: Subject to any disclaimer, the term of this patent is extended or adjusted under 35 U.S.C. 154(b) by 146 days.

(21) Appl. No.: 13/789,748

(22) Filed: Mar. 8, 2013

(65) Prior Publication Data

US 2014/0252039 A1  Sep. 11, 2014

(51) Int. Cl.
| | | |
|---|---|---|
| *B65D 1/02* | (2006.01) | |
| *B65D 23/10* | (2006.01) | |
| *B65D 25/56* | (2006.01) | |
| *B65D 1/04* | (2006.01) | |
| *B65D 1/40* | (2006.01) | |
| *G01F 11/26* | (2006.01) | |

(52) U.S. Cl.
CPC ............ *B65D 1/0223* (2013.01); *B65D 1/04* (2013.01); *B65D 1/40* (2013.01); *B65D 23/10* (2013.01); *B65D 25/56* (2013.01); *G01F 11/262* (2013.01)

(58) Field of Classification Search
CPC .......... A47G 19/14; B67D 7/56; B65D 37/00; B65D 47/20; B65D 1/0223; B65D 1/04; B65D 1/40; B65D 23/10; B65D 25/56; G01F 11/26; G01F 11/262
USPC ........... 222/143, 158, 207, 210, 454–457, 1, 222/465.1–470, 452; 141/2, 83, 323, 141/346; 215/381–385; 220/501, 505, 220/555, 557, 676, 770–771, 775–776
See application file for complete search history.

(56) References Cited

U.S. PATENT DOCUMENTS

| | | | | |
|---|---|---|---|---|
| 3,214,052 | A * | 10/1965 | Dike .................. | B65D 21/0231 206/509 |
| 3,251,514 | A * | 5/1966 | Speicher ............. | B65D 1/0223 215/398 |
| 4,298,038 | A * | 11/1981 | Jennings ............ | 141/2 |
| 4,418,843 | A * | 12/1983 | Jackman ............ | G01F 19/00 222/158 |
| 4,646,948 | A * | 3/1987 | Jennings ............ | 222/454 |
| 4,834,269 | A * | 5/1989 | Cone ................. | 222/465.1 |
| 4,860,927 | A * | 8/1989 | Grinde ............... | G01F 11/26 222/158 |
| 4,893,732 | A * | 1/1990 | Jennings ............ | 222/109 |

(Continued)

*Primary Examiner* — Paul R Durand
*Assistant Examiner* — Andrew P Bainbridge
(74) *Attorney, Agent, or Firm* — Ladas & Parry LLP

(57) ABSTRACT

A measuring and dispensing container having a flexible walled reservoir chamber, a measuring and dispensing chamber and a conduit for transferring liquid from said reservoir chamber to said measuring and dispensing chamber. The reservoir is provided with a non-squeezable handle by which it can be grasped when tilting the container to dispense liquid from the dispensing chamber so as to reduce the risk that excess force applied to the reservoir by a hand holding it will squeeze more liquid than intended into measuring and dispensing chamber. Such handle may be formed by reinforcement of at least one wall of the reservoir to provide sufficient rigidity to prevent squeezing at the reinforcement or by providing a "cut-out" in the reservoir chamber through which a user's fingers may pass and providing reinforcement on or in one or more walls of the reservoir chamber proximate to the cut out.

28 Claims, 13 Drawing Sheets

(56) References Cited

U.S. PATENT DOCUMENTS

| | | | | |
|---|---|---|---|---|
| 5,000,353 | A * | 3/1991 | Kostanecki | G01F 11/263 222/207 |
| 5,054,660 | A * | 10/1991 | Sherman et al. | 222/454 |
| 5,071,039 | A * | 12/1991 | Anglehart | 222/158 |
| 5,122,399 | A * | 6/1992 | Farrell et al. | 428/34.2 |
| 5,330,081 | A * | 7/1994 | Davenport | 222/207 |
| 5,556,011 | A * | 9/1996 | Jennings et al. | 222/455 |
| 6,022,134 | A * | 2/2000 | Andrews | 366/130 |
| 6,068,161 | A * | 5/2000 | Soehnlen et al. | 222/143 |
| 6,290,102 | B1 * | 9/2001 | Jennings et al. | 222/158 |
| 6,824,001 | B2 * | 11/2004 | Johnson | B29C 63/42 215/12.1 |
| 7,156,265 | B2 * | 1/2007 | Walsh et al. | 222/465.1 |
| 7,644,829 | B2 * | 1/2010 | Little et al. | 215/384 |
| 7,913,874 | B2 * | 3/2011 | Gruskin | B65D 25/2897 215/384 |
| 8,079,484 | B2 * | 12/2011 | Wachsberg | B65D 25/40 215/235 |
| D654,813 | S * | 2/2012 | Jennings et al. | D9/741 |
| 8,261,932 | B2 * | 9/2012 | Miura | B29C 49/20 215/398 |
| 8,641,891 | B1 * | 2/2014 | Crowder | 210/136 |
| 8,714,386 | B2 * | 5/2014 | Sasaki | B65D 1/0223 215/386 |
| D706,645 | S * | 6/2014 | Jennings et al. | D9/742 |
| 2003/0029884 | A1 * | 2/2003 | Rau | B65D 75/58 222/92 |
| 2003/0077006 | A1 * | 4/2003 | Siegel | B65D 33/08 383/10 |
| 2006/0071039 | A1 * | 4/2006 | Bone | 222/465.1 |
| 2008/0257917 | A1 * | 10/2008 | Lee | 222/456 |
| 2011/0127297 | A1 * | 6/2011 | Jennings et al. | 222/212 |
| 2011/0284578 | A1 * | 11/2011 | Wong | 222/40 |

\* cited by examiner

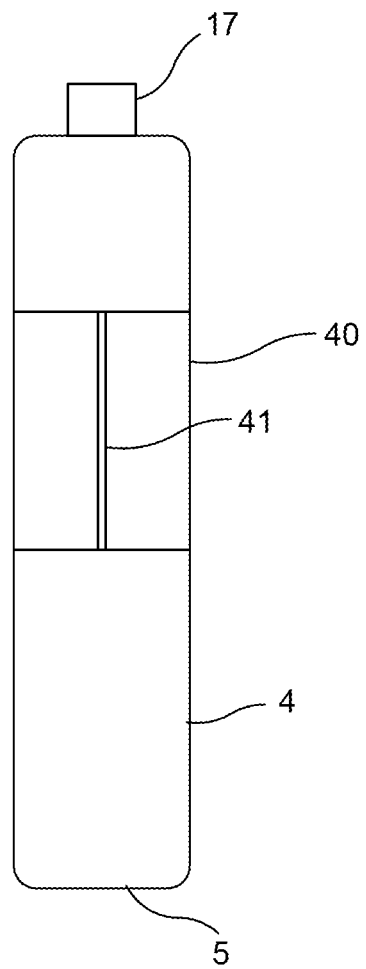
F I G. 3

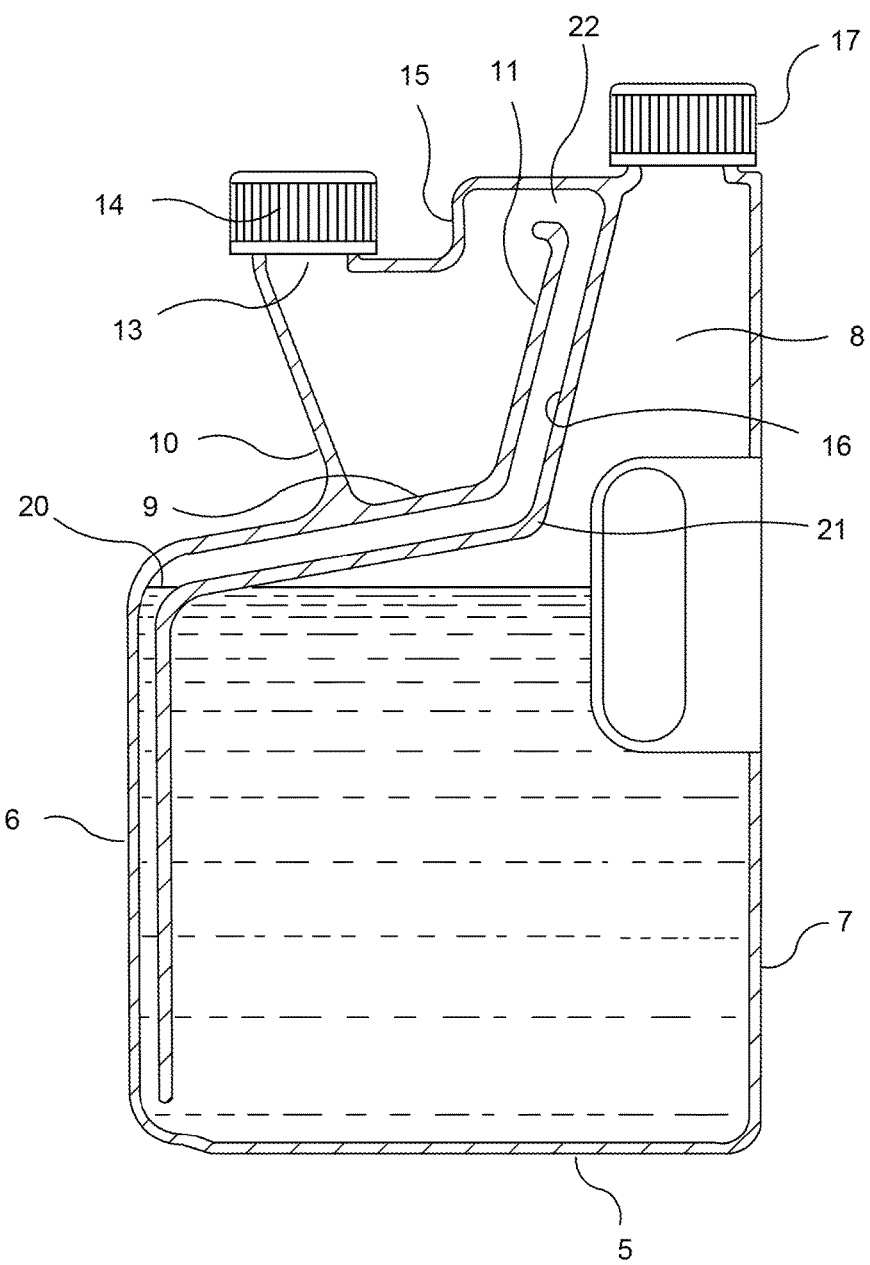
F I G. 13

MEASURING AND DISPENSING CONTAINER

FIELD OF THE INVENTION

The present invention relates to measuring and dispensing containers having a separate reservoir chamber and a measuring and dispensing chamber.

BACKGROUND OF THE INVENTION

Measuring and dispensing containers having a reservoir or storage chamber and a measuring chamber arranged to receive a predetermined amount of liquid from the reservoir chamber and subsequently dispense that predetermined amount of liquid are known. Examples of such measuring and dispensing chambers are disclosed in U.S. Pat. Nos. 4,079,859; 4,298,038; 4,646,948; 4,893,732; and 6,290,102

U.S. Pat. No. 4,646,948 discloses a number of embodiments of containers in which liquid is poured from a reservoir chamber to a measuring chamber. When the desired amount of liquid has accumulated in the measuring chamber, surplus liquid is returned to the reservoir chamber by controlled tilting of the container and then the measured accumulation is dispensed from the measuring chamber.

U.S. Pat. No. 4,893,732 provides a drain back opening in a wall of a measuring chamber whereby, when the measuring chamber is overfilled from a reservoir chamber, surplus liquid will drain back into the reservoir chamber leaving a predetermined measured amount of liquid in the measuring chamber to be dispensed therefrom.

U.S. Pat. No. 6,290,102 is an example of a measuring and dispensing chamber in which transfer of liquid from the reservoir or storage chamber to the measuring chamber is effected by way of a tube or conduit. Transfer is effected by squeezing the reservoir or storage chamber to force liquid through the tube and into the measuring and dispensing chamber. In that example, it is important to locate the lower (upstream) end of the tube in a position that, when the container is tilted to discharge liquid from the measuring and dispensing chamber, the lower upstream end of the tube is clear of liquid in the reservoir or storage chamber.

British Patent Publication GB 2038779 describes a dispensing container in which a dispensing receptacle of defined volume is linked to a deformable squeeze-bottle and by squeezing the bottle, liquid can be forced into the dispensing receptacle. The conduit linking the squeeze bottle with the dispensing receptacle is horizontal and at the top of the container with the risk that liquid being squeezed from the squeeze bottle into the dispensing receptacle may splash out of that receptacle when it hits the wall of the dispensing receptacle thereby causing safety problems, particularly if the liquid being dispensed is hazardous in some way, for example in the case of some agricultural or horticultural materials.

Our application Ser. No. 11/643,341 describes ways of utilizing such measuring and dispensing chambers in containers in which the reservoir is made of deformable material so that liquid can be "squeezed" from the reservoir to the measuring container and utilizes a shaped conduit to minimize the risk of liquid being sucked back into the reservoir when the squeeze is released. Reference is also made to the desirability of the liquid entering the reservoir chamber in a downward direction.

Our application Ser. No. 12/954,318 describes a way to avoid the problems that arise when a squeezable reservoir is used so that liquid enters the measuring and dispensing chamber at a velocity such that if steps are not taken to prevent it, liquid becomes sprayed against the measurement markings or begins to foam making it difficult to make accurate determinations as to when liquid in the measuring and dispensing chamber has filled it up to any desired marking. This is accomplished by directing incoming liquid against an appropriate wall, for example by disposing the outlet from the conduit which brings liquid from the flexible reservoir chamber to the measuring and dispensing chamber such that it directs outgoing liquid against an appropriate wall or by locating a baffle in the measuring and dispensing chamber adjacent to the outlet so as to direct liquid entering the measuring and dispensing chamber against an appropriate wall.

We have found also that unlike the situation wherein liquid is transferred from a rigid reservoir chamber to a measuring and dispensing chamber, when a squeezable reservoir is used, liquid there is a tendency to squeeze the reservoir while pouring liquid from the dispensing chamber and so squeeze more liquid into the measuring and dispensing chamber than intended thereby making it difficult to dispense the desired amount of liquid from the measuring and dispensing chamber. For example, one may initially transfer a desired amount of liquid to the measuring and dispensing chamber but then as a result of gripping the reservoir too hard while dispensing liquid from the container cause additional liquid to be transferred to the dispensing chamber and then be dispensed from it. This can be a problem, particularly where the liquid to be dispensed is an agrochemical, for example a herbicide, plant growth regulator or a chemical used in animal husbandry where supply of an overdose can have adverse consequences.

SUMMARY OF THE INVENTION

According to the present invention there is provided a measuring and dispensing container having a flexible walled reservoir chamber, a measuring and dispensing chamber and a conduit for transferring liquid from said reservoir chamber to said measuring and dispensing chamber, wherein said reservoir is provided with a non-squeezable handle by which it can be grasped when tilting the container to dispense liquid from the dispensing chamber so as to reduce the risk that excess force applied to the reservoir by a hand holding it will squeeze more liquid than intended into measuring and dispensing chamber.

The present invention therefore requires a construction in which the reservoir can be squeezed to transfer liquid from the reservoir chamber to the measuring and dispensing chamber but in which the container can be held, normally by gripping the reservoir chamber or a handle associated therewith in such manner that liquid can be poured from the measurement and dispensing chamber without squeezing the reservoir chamber. In order to avoid the problems that can occur in storage and shipment when containers of this type have protruding handles, the means provided for gripping the container while in use should not protrude outside the spatial area circumscribed by the wall of the container, typically the spatial area circumscribed by the walls of the reservoir chamber. It is not essential that the handle is formed by separate elements and could be provided by simple reinforcement of at least one wall of the reservoir chamber, typically the rear wall of the reservoir, at a location at which it is to be grasped so as provide sufficient rigidity to prevent squeezing in this location. In such cases, the location of the reinforcement will normally indicated on the outside of the container to ensure that when the contents of the container are being dispensed, the container is gripped in a non-squeezable location. More normally, however, the handle will form a distinct element of the container.

In a preferred embodiment, a rigid handle oriented parallel to the longitudinal axis of the container may be provided on the rear wall of the reservoir, for example by placing it in a recess in the wall. In a variation of this embodiment, the part of the reservoir chamber adjacent to the handle may be narrower than the lower portion of the reservoir chamber and this narrowing may if desired be continued to the top of the reservoir chamber.

In another embodiment, the handle is formed by a providing a "cut-out" in the reservoir chamber through which a user's fingers may pass and providing reinforcement on or in one or more walls of the reservoir proximate to the cut out preferably the wall that is "opposite" the cut out. For example such cut out can provide a gap between part of the rear wall of the dispensing and measuring chamber and part of the front wall of the reservoir. In one embodiment, such cut out is trapezoidal in shape, with the longer side of the trapezium being located in the front wall of the reservoir chamber. In such embodiments the handle is formed by a portion of the reservoir having dimension such that it can be grasped for pouring liquid out of the measuring and dispensing chamber. This portion of the reservoir chamber is not compressible. If necessary, this may be accomplished by use of thickened walls in this part of the reservoir chamber, the other parts being flexible so that liquid can be squeezed into the measuring and dispensing chamber. Other means for accomplishing this include provision of internal or external supports to impart rigidity to that part of the container.

In general the first of these embodiments is more useful for smaller containers of half a gallon (2 liters) or less and the embodiment with the "cut out" handle for larger sized containers.

Typically, at least one wall of the measurement and dispensing chamber bears measurement markings indicting the amount of liquid transferred to the measurement and dispensing chamber and which is to be used as the "dose" to be used. In some applications, however, the measurement and dispensing chamber may be configured to supply a fixed dose and in this case no measurement indicia are required.

Conveniently the measuring and dispensing chamber has front and rear walls that taper towards each other towards each other as they descend. The front wall of the reservoir chamber is conveniently disposed in a plane parallel to the rear wall of the reservoir. Alternatively, the measuring and dispensing chamber may be of some other shape, for example having a rounded front wall so that the overall shape of the chamber resembles that if a cone split along its longitudinal axis. In other embodiments, the measuring and dispensing chamber may be located above part of the reservoir chamber.

The conduit for transferring liquid from the reservoir chamber to the measuring and dispensing chamber may be of any convenient form that permits liquid to be 'squeezed' from the reservoir into the measuring and dispensing chamber. Most conveniently, however, the conduit will run from a location proximate to the bottom of the reservoir to a location proximate the top of one of the walls of the measuring and dispensing chamber. Such wall is desirably the wall opposite the point from which liquid will be dispensed from the measuring and dispensing chamber and is commonly referred to as the "rear wall" and is desirably an inclined wall (which minimizes foaming) and not one on which the measurement markings are located.

The features described above may be combined with those described in our earlier application Ser. Nos. 12/954,318 and 11/643,341, both of which are incorporated herein by reference.

In one such embodiment, the conduit leading from the reservoir chamber to the measuring and dispensing chamber is disposed so as to cause liquid being transferred from the reservoir to the measurement and dispensing chamber to enter said chamber pointed in a downward direction. In one embodiment of this type, liquid entering the measuring and dispensing chamber is directed to cause it to run down a wall of the measuring and dispensing chamber.

There are a number of ways in which the liquid entering the measuring and dispensing chamber may be directed against the appropriate wall, for example by disposing the outlet from the conduit which brings liquid from the flexible reservoir chamber to the measuring and dispensing chamber such that it directs outgoing liquid against an appropriate wall or by locating a baffle in the measuring and dispensing chamber adjacent to the outlet so as to direct liquid entering the measuring and dispensing chamber against an appropriate wall.

It is also preferred that the outlet from the conduit into the measuring and dispensing chamber is sufficiently close to the wall down which the liquid will run that turbulence in the liquid is avoided so as to minimize the risk of foaming. By directing liquid entering the measuring and dispensing chamber in this way so as to run down a wall rather than being released into a void, one is minimizing the risk of foaming in the same way that one does when beer or champagne are poured into a tilted glass.

In order further to assist in ensuring that the correct quantity of liquid is dispensed from the measuring and dispensing chamber, it is preferred that the axis of dispensing outlet is parallel with the front wall of the measuring and dispensing chamber and that at least at one point on the edge of the outlet, there is a flush surface of the with front wall of the measuring and dispensing chamber, the axis of the dispensing outlet being oriented parallel to that wall and located at the point of intersection of that wall and the upper wall of the measuring and dispensing chamber. In some designs the front wall of the measuring and dispensing chamber is set at an angle to the vertical so as to make it easier to ensure that all liquid in the measuring and dispensing chamber can be poured out without the need completely to rotate the container by at least 90° to make sure that it is fully drained. These features assist in making sure that none of the liquid that has been transferred to the measuring and dispensing chamber is retained in it when the chamber is emptied.

In another embodiment the conduit bringing liquid from the reservoir chamber to the measuring and dispensing chamber comprises at least two bends at spaced intervals along the path, or that the conduit is contoured to provide a trap to minimize 'suck back" when a the reservoir ceases being squeezed.

According to a still further aspect of the invention, there is provided a method of measuring and dispensing a predetermined quantity of liquid from a container having a flexible reservoir chamber, a measuring and dispensing chamber, and a conduit interconnecting said reservoir and measuring chambers, said method including the steps of pouring liquid through a filling opening into said reservoir chamber, sealing said filling opening, venting a pouring opening from said measuring chamber, squeezing said flexible reservoir chamber to force liquid from said reservoir chamber through said conduit into said measuring and dispensing chamber until the predetermined quantity has entered said measuring and dispensing chamber, said liquid being directed upon entry into the measuring and dispensing chamber, for example against a wall of the measuring and dispensing chamber other than that bearing measurement markings, such wall down which the liquid is directed typically being the rear wall of the measuring and dispensing chamber, opening said pouring opening and tilting said container by use of a handle adapted to prevent any further squeezing of the reservoir so as to dispense the measured amount of liquid from the measuring and dispensing chamber.

When used herein the term "handle" means a part of the container that can be grasped by a user to tip the container into a position in which liquid can be poured from the measuring and dispensing chamber without squeezing the reservoir chamber to such an extent that additional liquid is forced from the reservoir chamber to the measuring and dispensing chamber.

BRIEF DESCRIPTION OF THE DRAWINGS

Embodiments of the invention will now be described with reference to the accompanying drawings in which:

FIG. 3 is a rear view of the embodiment of FIG. 1;

FIG. 13 is a sectional view of a fourth embodiment of the invention in which the top surface wall of the measuring and dispensing chamber is shaped so as to direct incoming liquid to flow down the rear wall of the measuring and dispensing chamber;

DESCRIPTION OF SPECIFIC EMBODIMENTS

It will be appreciated that the first second and third embodiments show different types of handle and reservoir configurations and that the fourth, fifth sixth and seventh embodiments show different arrangements with respect to transfer of liquid from the reservoir chamber to the measuring and dispensing chamber. One of ordinary skill in the art will understand that any of the handle and reservoir chamber configurations used in the first second and third embodiments can be combined with any of the liquid transfer arrangements of the fourth to seventh embodiments.

Figures 1, 2:
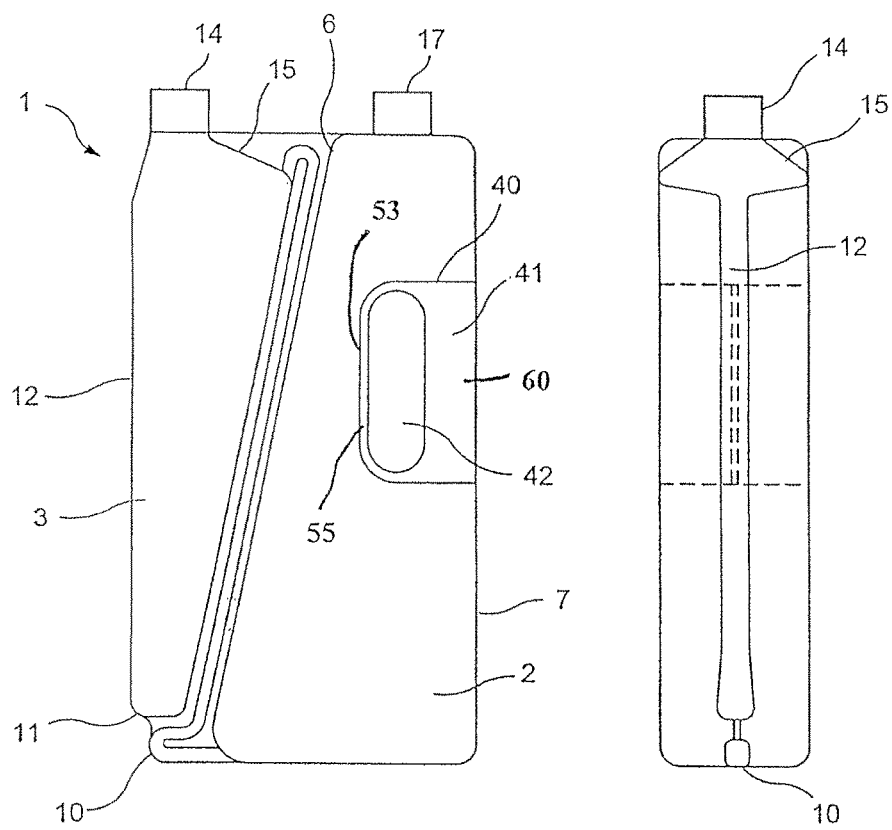
FIG. 1 is a side view of a first embodiment of the invention wherein the handle is incorporated in a recess in the rear wall of the reservoir.
FIG. 2 is a front view of the embodiment of FIG. 1.

Referring now to the drawings, a first embodiment of the invention is described with reference to FIGS. 1-3. FIG. 1 is a side view of a container of the invention which is used for storing, measuring, and dispensing a predetermined amount of liquid. The container 1 includes a reservoir chamber 2 and a measuring and dispensing chamber 3 in fluid communication therewith through a conduit 10. The reservoir chamber 2 is defined by side walls 4, a bottom 5, a front wall 6, and a rear wall 7. It will be appreciated that, although only one side wall 4 is shown, the opposite side wall of the container is a mirror image thereof. A handle 43 is provided in a recess 40 located in the rear wall 7 of the reservoir chamber 2. The handle is formed by a web 41 having an aperture 42 through which the fingers of the user may pass. The recess 40 is oriented with its longer side, recessed wall 53, located in the rear wall of the reservoir and its shorter sides substantially parallel to the bottom wall 5 of the container. The web 41 forming the handle contacts all three sides of the recess 40 and is oriented so that major axis of the aperture in the web 41 lies in a plane perpendicular to the bottom wall 5 of the container. The handle 43 has a first portion 55 that contacts recessed wall 53 and a second portion 60 that is spaced from the front wall 12 a greater distance than is the first portion 55.

The top of the reservoir has a closeable inlet through which the reservoir may be filled. Typically this is a screw threaded opening onto which a screw-threaded filling cap 17 may be fitted.

A conduit 10 runs from the base of the reservoir chamber 2 to the top of the dispensing and measuring chamber 3 is located adjacent to the main body of the reservoir chamber 2 with its lowest portion slightly above the bottom wall of the reservoir chamber. The rear wall of the measuring and dispensing chamber and the front wall of the reservoir chamber are both inclined away from the vertical and are parallel with each other. The rear wall of the measuring and dispensing chamber is located forwardly of the conduit 10. The measuring and dispensing chamber 3 has a bottom 11 and is of semicircular cross-section, the front wall 12, extending upwardly from the bottom 11 and leads to a dispensing outlet 13 which is sealingly closeable by a dispensing cap 14. Upper wall structure 15 completes the measuring and dispensing chamber.

Figure 4:
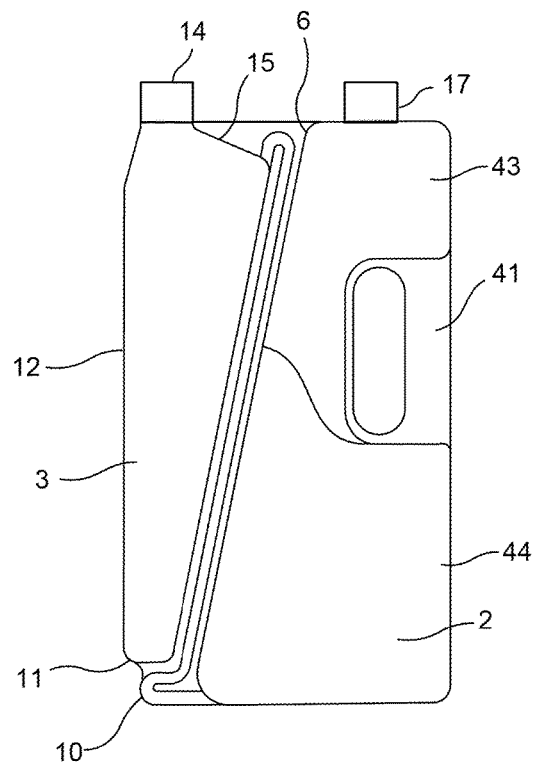
FIG. 4 is a side view of a second embodiment of the invention wherein the handle is incorporated in a recess in the rear wall of the reservoir and the reservoir container is shaped to be thinner in the region of the handle than in its lower portion so as to reduce the risk of squeezing the reservoir during the pouring of liquid from the measuring and dispensing chamber.
Figure 5:
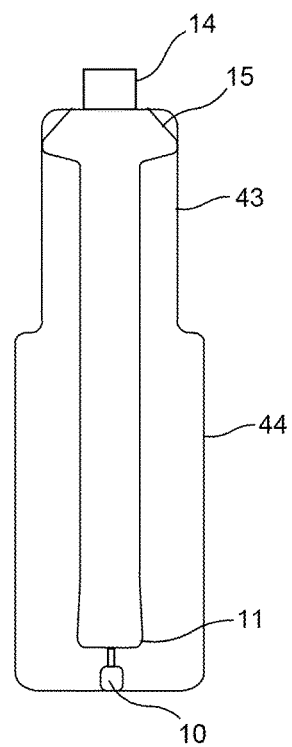
FIG. 5 is a front view of the embodiment of FIG. 4.
Figure 6:
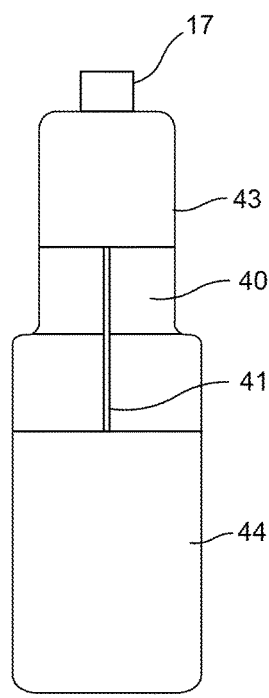
FIG. 6 is a rear view of the embodiment of FIG. 4.

A second embodiment of the invention is described with reference to FIGS. 4-6. This embodiment is similar to the first embodiment except that the upper portion of the reservoir chamber 43, within which the handle 41 is located is narrower than the lower portion 44, thereby reducing the risk that there will be squeezing of the reservoir while liquid is being poured. Conveniently, boundary 45 between the broader and narrower portions of the reservoir may have a step-like configuration so that even in the region in which the handle is located the forward part of the reservoir chamber is of the same width as the bottom part of the chamber. It is, however, possible to achieve the same result with other configurations, including for example a configuration in which part or all of the reservoir chamber is tapered from being wider in the lower part of the tapered region to narrower in the upper part of the tapered region.

Figure 7:
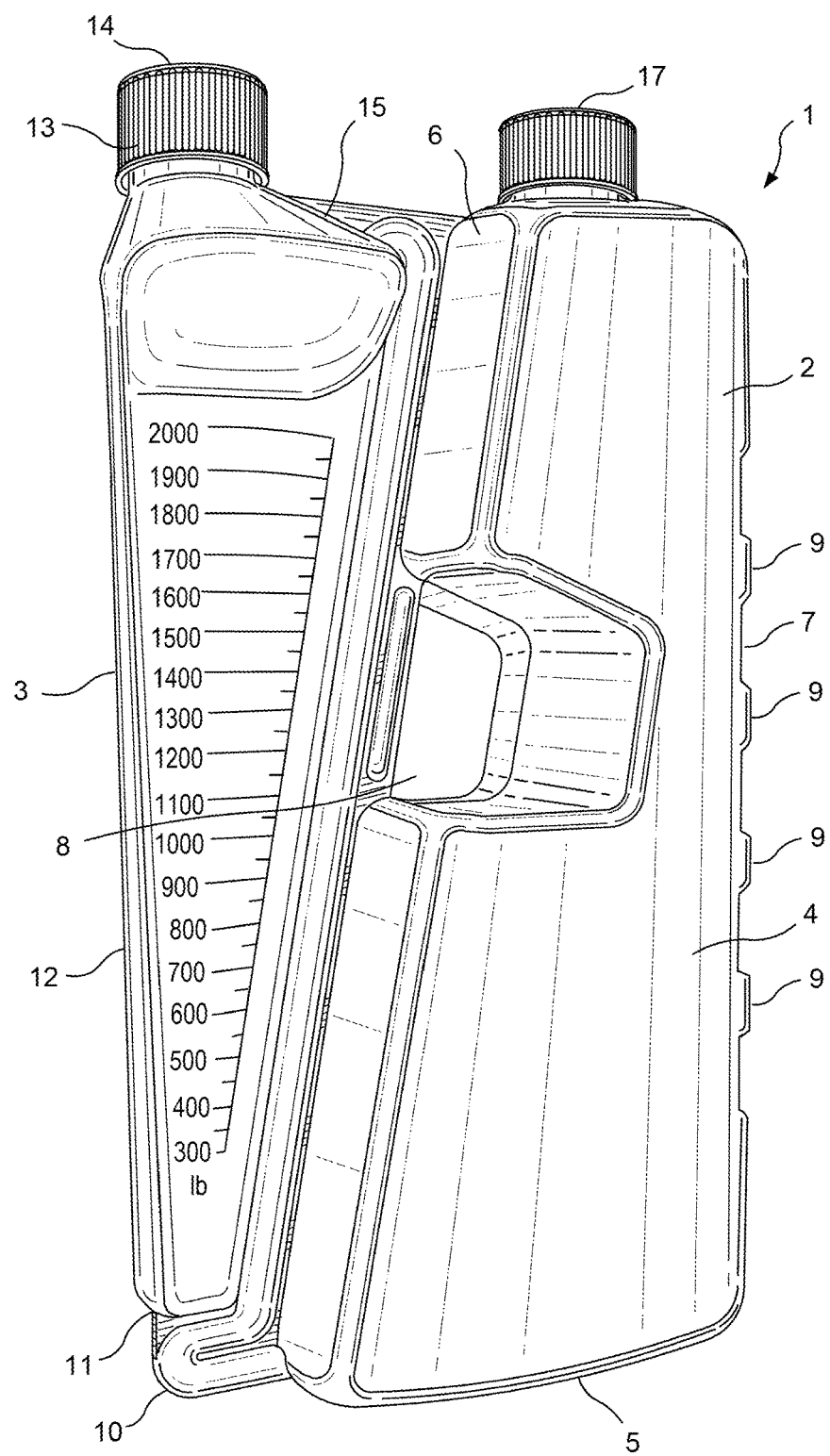
FIG. 7 shows a perspective view of a third embodiment of the invention in which the handle is provided by a cut out between part of the rear wall of the measuring and dispensing chamber and part of the front wall of the reservoir and the rear wall of the reservoir is provided with ridges to assist in gripping it and to prevent the reservoir from being squeezed in the region in which it is being held when the container is being tipped to dispense liquid from the measuring and dispensing chamber.
Figure 8:
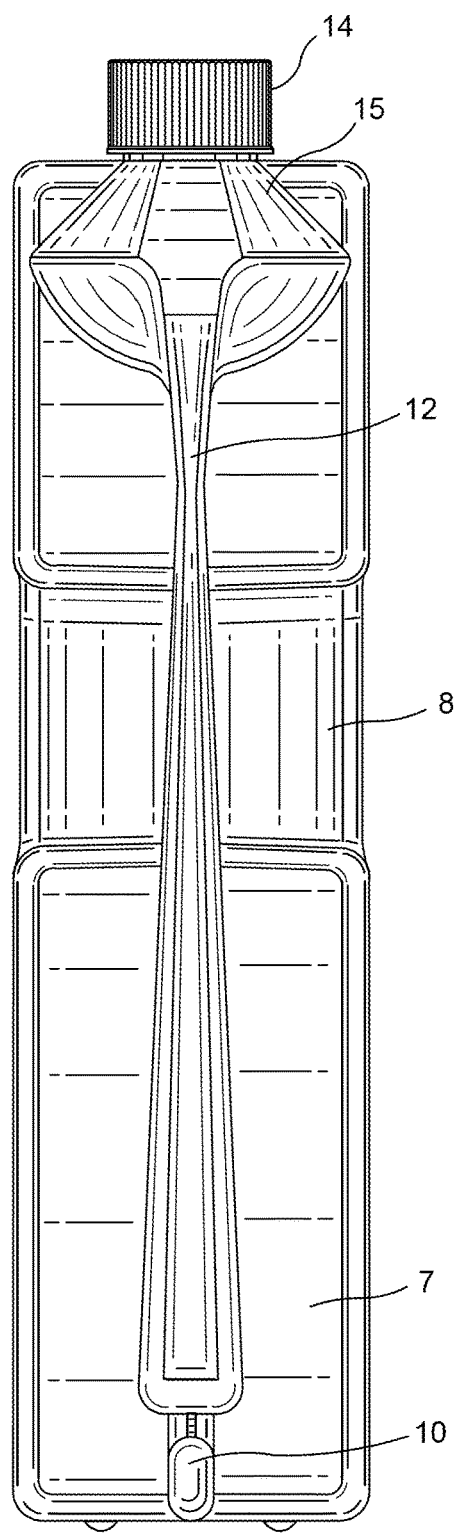
FIG. 8 is a front elevation of the embodiment of FIG. 7.
Figure 9:
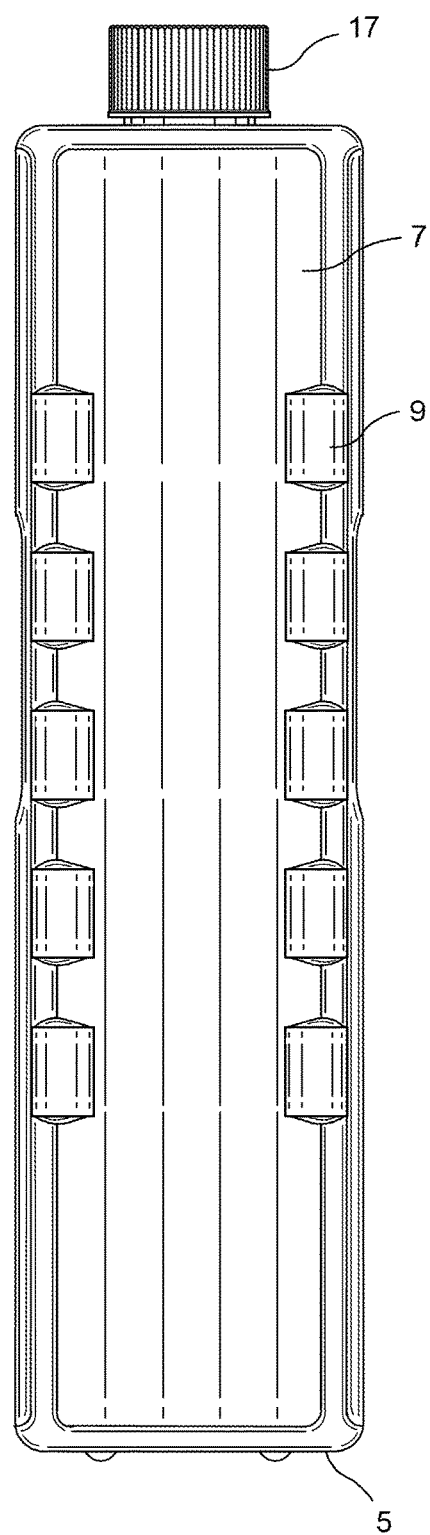
FIG. 9 is rear elevation view of the embodiment of FIG. 7.

A third embodiment of the invention is described with reference to FIGS. 7-12. FIG. 7 is a perspective view of a container of the invention which is used for storing, measuring, and dispensing a predetermined amount of liquid. The container 1 includes a reservoir chamber 2 and a measuring and dispensing chamber 3 in fluid communication therewith in a manner to be described hereinafter. The reservoir chamber 2 is defined by side walls 4, a bottom 5, a front wall 6, and a rear wall 7. It will be appreciated that, although only one side wall 4 is shown, the opposite side wall of the container is a mirror image thereof. A trapezoidally-shaped cut-out 8 is within the perimeter defined by the walls of the reservoir chamber 2. It will, however, be appreciated that cut outs may be of any convenient shape to permit pouring of liquid from the container without squeezing the reservoir chamber. Knobs or ridges 9 may be provided on the rear wall 7 of the container and may help to provide a grip when pouring contents from the container and, particularly if they extend across the width if the rear wall, may impart increased rigidity to the portion of the rear wall of the reservoir that corresponds with the location of the cut out so as to provide a handle for the container in which there is rigidity in the portion that is to be held when dispensing liquid so that this cannot be squeezed, but flexibility elsewhere in the reservoir chamber enabling it to be squeezed so that liquid can be squeezed from the reservoir chamber into the measuring and dispensing chamber. The knobs or ridges are typically molded with the container itself, but as an alternative may be made separately and fused to container after its production. Provision of such reinforcing knobs or ridges on the outside of the container may also assist in providing an improved gripping surface to assist those using the container. As an alternative to such external knobs or ridges, they may also be provided on the inside of the reservoir chamber or replaced completely by thickened walls in this part of the container so as to provide the necessary rigidity. Whatever the means provided for preventing local squeezing of the container, this should be located in the middle part of the rear wall, for example somewhere in the region between one quarter and three quarters of the distance from the top to the bottom of the rear wall and will typically extend for a sufficient distance that they can be grasped comfortably by the user's hand, say from a third to a half of the length of the rest wall.

The top of the reservoir has a closeable inlet 16 through which the reservoir may be filled. Typically this is a screw threaded opening onto which a screw-threaded filling cap 17 may be fitted.

A conduit 10 runs from the base of the reservoir chamber 2 to the top of the dispensing and measuring chamber 3 is located adjacent to the main body of the reservoir chamber 2 with its lowest portion slightly above the bottom wall of the reservoir chamber. The rear wall of the measuring and dispensing chamber and the front wall of the reservoir chamber are both inclined away from the vertical and are parallel with each other. The rear wall of the measuring and dispensing chamber is located forwardly of the conduit 10. The measuring and dispensing chamber 3 has a bottom 11 and is of semicircular cross-section, the front wall 12, extending upwardly the bottom 9 and leads to a dispensing outlet 13 which is sealingly closeable by a dispensing cap 14. Upper wall structure 15 completes the measuring and dispensing chamber.

A fourth embodiment is shown in FIG. 13, in which the handle of the reservoir is similar to that shown in FIG. 7, but the measuring and dispensing chamber 3 is located above the main body of the reservoir chamber 2 and forwardly of the filling conduit 10. The measuring and dispensing chamber 3 has a bottom 11 and walls upstanding therefrom. The front wall 12 extends upwardly and forwardly from the bottom 11 and leads to a dispensing outlet 13 which is sealingly closeable by a dispensing cap 14. Upper wall structure 15 completes the measuring and dispensing chamber and is shaped so as to provide a step down between the rear and front wall of the measuring chamber so as provide a vertical surface close to and opposite the outlet through which liquid enters the measuring chamber such that incoming liquid is directed to flow down the rear wall of the measuring and dispensing chamber. The reservoir chamber 2 has a recess 40 in its rear wall in which is mounted a handle 41 having an aperture 42 the grasping of which permits the container to be tilted to dispense liquid from the measuring and dispensing chamber without applying any force to the reservoir such as would result in additional liquid being squeezed into the measuring and dispensing chamber.

Figure 10:
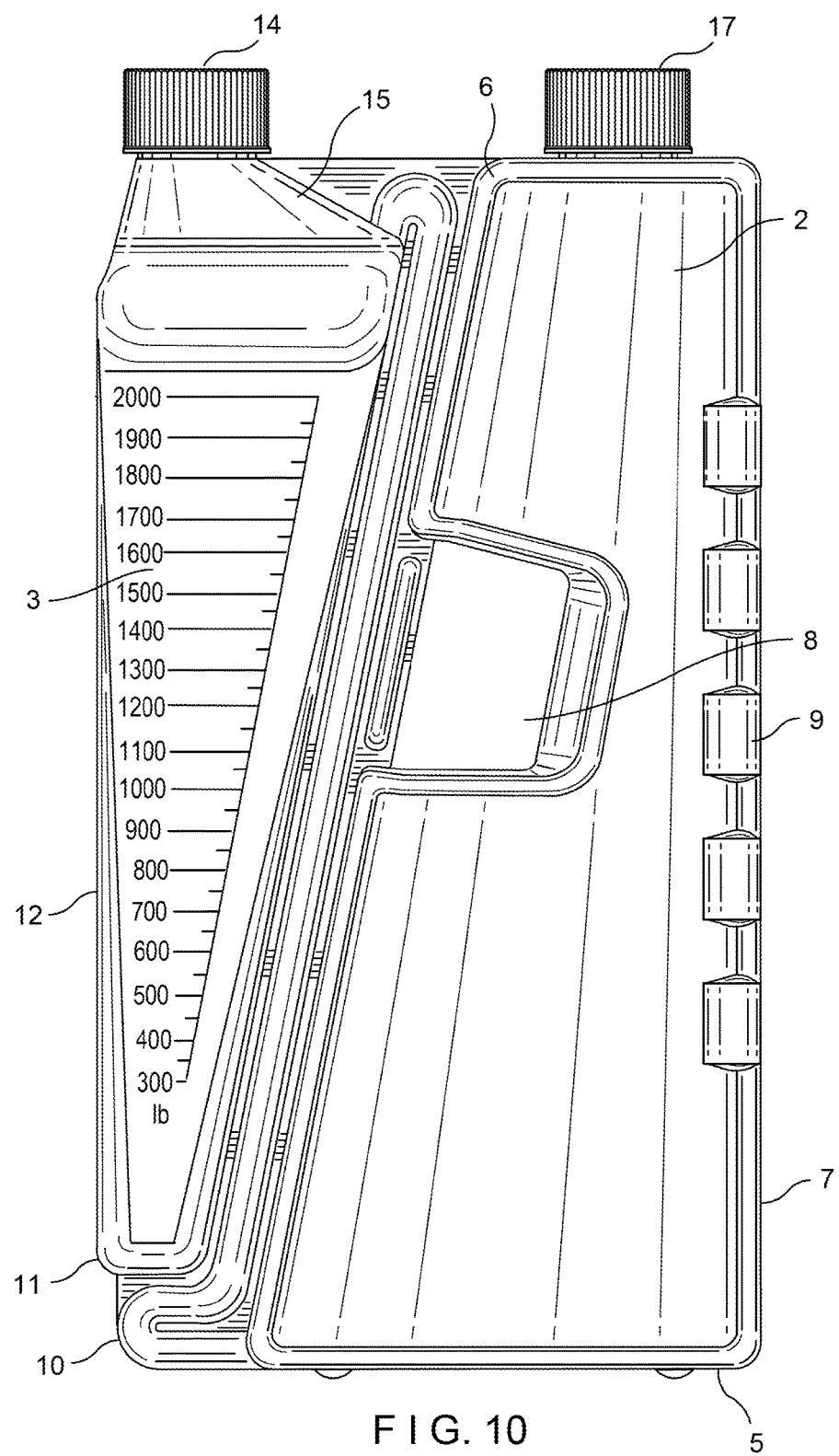
FIG. 10 is a left side elevation view of the embodiment of FIG. 7.

In the fifth embodiment shown in FIG. 10 the handle arrangement is as shown in FIG. 1, but the conduit from the reservoir chamber to the measuring and dispensing chamber is in the form of an internal connecting tube 16. A one-piece molding enables the tube 16 to be integrally formed with the reservoir chamber and measuring and dispensing chamber.

The angled configuration of the connecting tube 16 will now be described. The connecting tube provides a continuous passage having a first portion which extends upwardly along the front wall 6 of the container 2 from an entrance proximate the bottom 5 of the container to a first bend 20 proximate the top of the main body portion of the chamber 2. From the first bend 20, a portion of the tube extends upwardly and rearwardly to pass below the measuring and dispensing chamber 3 to a second bend 21. From that second bend 21, a portion of the tube extends upwardly along the rear wall 11 of the measuring and dispensing chamber 3 to terminate at a tube exit 22 proximate the uppermost extremity of said rear wall 11, through which liquid exiting from the tube 16 enters the measuring and dispensing chamber 3.

The foregoing embodiment is particularly suitable for use with clear liquids. However, if the liquid is colored or opaque, there is a risk that when entering the measuring and dispensing chamber, the liquid will be propelled across the measuring and dispensing chamber by the squeezing driving force and will collide with the internal walls of the measuring dispensing chamber and will then run down those wall making it difficult to determine the actual level of liquid in said chamber.

Figure 11:
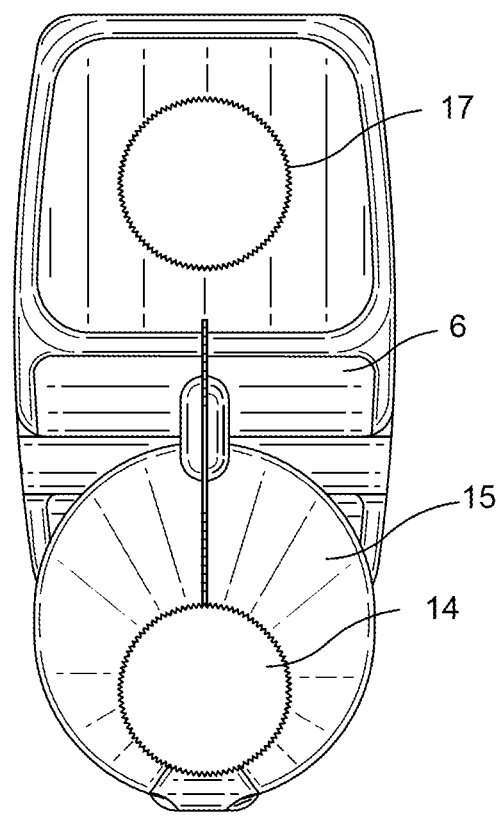
FIG. 11 is a top plan view of the embodiment of FIG. 7.
Figure 12:
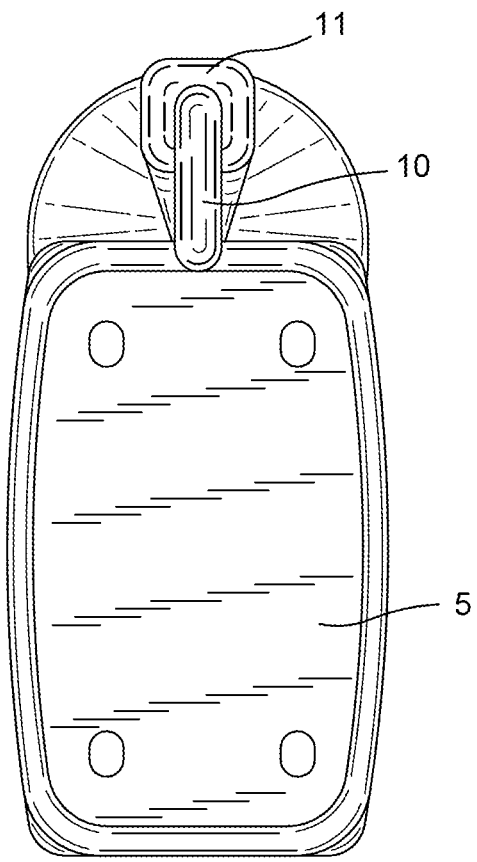
FIG. 12 is a bottom plan view of the embodiment of FIG. 7.
Figure 14:
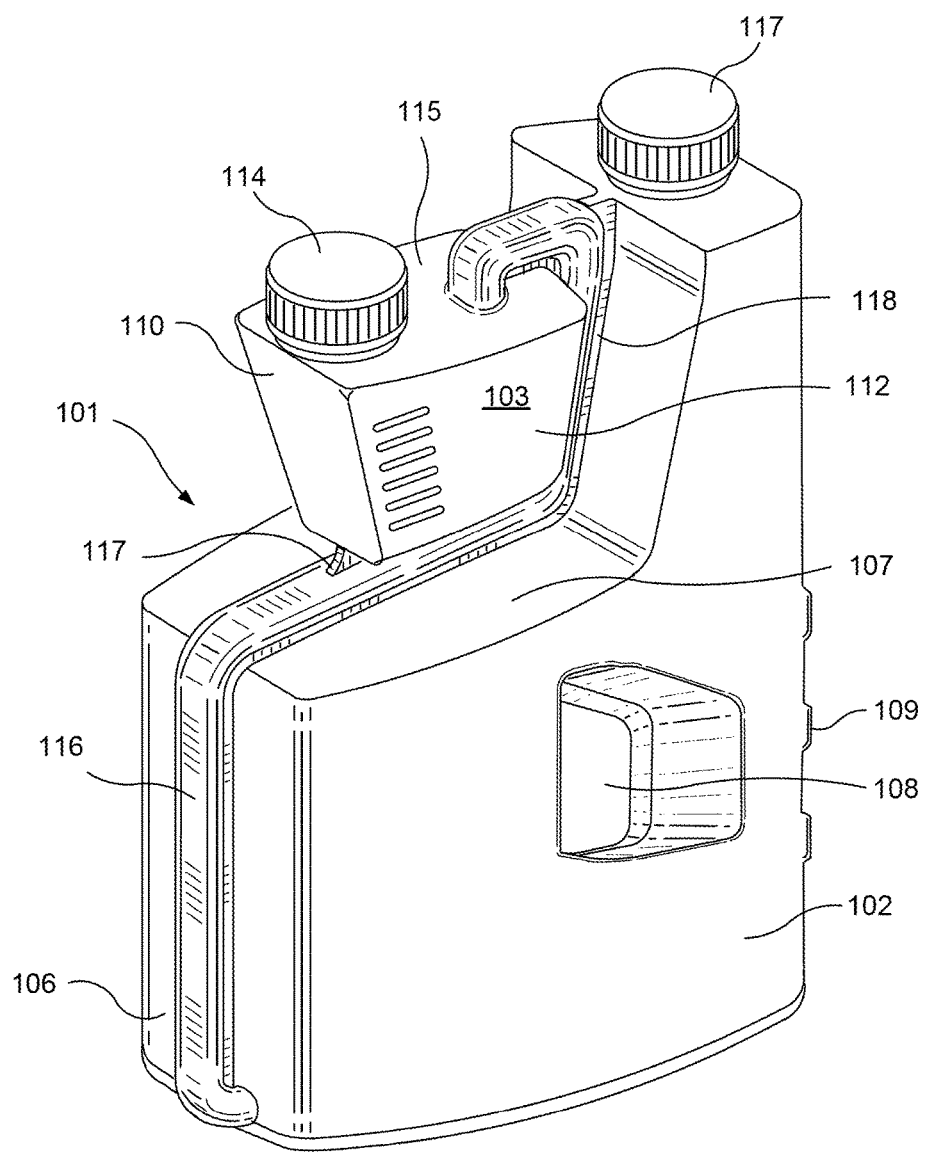
FIG. 14 is a perspective view of a fifth embodiment designed to ensure a downward flow of liquid into the dispensing and measuring chamber.

FIG. 14 of the drawings depicts sixth embodiment in which a container of the type described in application Ser. No. 11/643,341 modified to have a handle arrangement as hereinbefore described with reference to FIG. 7 hereof. The arrangement shown in FIG. 11 provides one approach to the problem of having liquid entering the measurement and dispensing chamber run down the walls thereof and so make it difficult to determine when the desired amount of liquid has been transferred to the measurement and dispensing chamber. In this embodiment, liquid enters the measuring and dispensing chamber from the top and drops directly by gravity to the bottom of said chamber.

In this type of container, the overall configuration of the container is similar to that of the embodiment described with reference to FIGS. 7 to 12 of the drawings. Thus, the container 101 includes a flexible walled reservoir chamber 102 and a measuring and dispensing chamber 103 in fluid communication therewith. The reservoir includes a cut-out section 108 to provide a handle for use in tipping the container to dispense liquid and reinforcing ribs 109 to prevent squeezing of the reservoir chamber when liquid is being poured from the dispensing and measuring chamber 103.

The measuring and dispensing chamber 103 is located above the main body of the reservoir chamber 102 and forwardly of the filling passage 180. The measuring and dispensing chamber 103 has a bottom 109 and front 110, rear 111, and side 112 walls upstanding therefrom. Upper wall structure 115 completes the measuring and dispensing chamber.

A conduit in the form of a connecting tube 116 provides for the passage of liquid between the reservoir chamber and the measuring and dispensing chamber. The tube 116 is preferably integrally formed with the reservoir chamber and the measuring and dispensing chamber and lies on and upwardly along the front wall 106 of the reservoir chamber 102 and is then angled or bent to extend rearwardly between the upper wall 107 of the reservoir chamber 102 and the bottom wall 109 of the measuring and dispensing chamber 103. After passing rearwardly below the measuring and dispensing chamber 103, the tube 106 is again angled or bent to extend upwardly between the rear wall 111 of the measuring and dispensing chamber 103 and the adjacent wall portion defining the filling passage 180 of the reservoir chamber 102.

The container is preferably formed by molding and compressing molding will create webs or fillets 117, 118 which respectively space the tube 116 from the tube confining wall portions of the reservoir and measuring and dispensing chamber.

When the tube 116 emerges above the level of the upper wall 115 of the measuring and dispensing chamber 103 it is again angled or bent to extend over the upper wall 115 and then downwardly to enter the measuring and dispensing chamber through an opening 125 in the upper wall 115 thereof. With this configuration, liquid pouring through the tube in a manner to be described hereinafter will enter the measuring and dispensing chamber 103 from above.

The important difference between the embodiments shown in FIGS. 7 to 12 on the one hand and FIG. 14 on the other hand is that, when the body of the reservoir chamber 102 is squeezed and the flexible side walls permit liquid to be forced from the reservoir chamber 102 upwardly and through the tube 116 to enter the measuring and dispensing chamber 103 in the manner shown in FIG. 14 of the drawings, the liquid enters the measuring and dispensing chamber downwardly from the top thereof, and splash and undesirable coating of the side, front, and rear walls of the said measuring and dispensing chamber is minimized.

Figure 15:
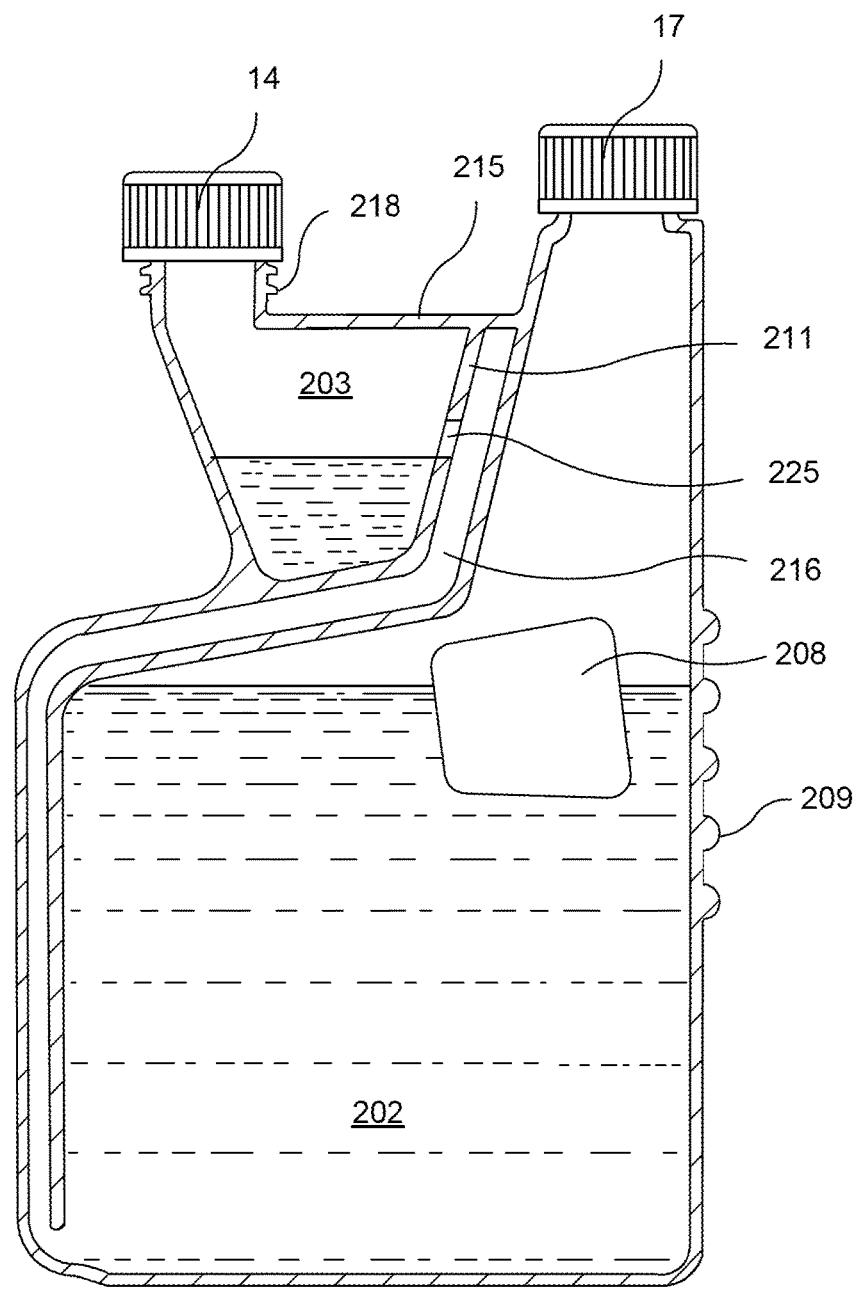
FIG. 15 is a sectional view of a sixth embodiment in which a "drain back" is provided in the measuring and dispensing chamber to provide for "fixed dosage" of the liquid to be dispensed.

FIG. 15 of the drawings shows seventh embodiment of the invention in which features described in application Ser. No. 11/643,341 are combined with the handle requirements of the present invention.

The reservoir chamber 202 is provided with a cut out 208 to provide a handle for use when liquid is being poured from the measuring and dispensing chamber and with reinforcing ribs 209 to prevent squeezing of the reservoir when liquid is being pored from the measuring and dispensing chamber. In this embodiment, the rear wall 211 of the measuring and dispensing chamber 203 extends up to and is sealed to the upper wall structure 215 of said measuring and dispensing chamber 203. In this embodiment an aperture or "bleed-hole" 225 is formed in the rear wall 211 of the measuring and dispensing chamber 203 and provides fluid communication between the interior of the measuring and dispensing chamber 203 and tube 216.

The operation of the this embodiment differs only from that of the embodiment described with reference to FIGS. 7 to 12 only in that, upon squeezing the container, liquid is forced from the reservoir chamber 202 through the tube 216 and then through the aperture 225 into the measuring and dispensing chamber 203. With the dispensing cap 214 loosened on the screw-threaded neck 218 and hence venting the measuring and dispensing chamber 203 to atmosphere, when the measuring and dispensing chamber 203 is filled with an amount of liquid in excess of the predetermined desired amount, release of squeezing pressure on the container will suck back excess material through the aperture 225 and tube 216 into the reservoir chamber 202. In this case no illustrative graduated scale on the measuring and dispensing chamber is necessary since the location of the aperture 225 will determine the desired and controlled amount of liquid in that chamber.

The preferred construction of this embodiment utilizes the described aperture or "bleed-hole" 225 in the rear wall 211 which is sealed to the upper wall structure 215 of the measuring and dispensing chamber 203. However, instead of an aperture 125 in the wall 211, the wall could terminate at the level of the aperture to form a weir which would limit the volume of liquid in the measuring and dispensing chamber by permitting surplus liquid to cascade back over the weir to enter the tube 216.

In an alternative to this, tube 216 does not extend to the upper wall 215 of the measuring and dispensing chamber but, instead, the rear wall 211 of the measuring and dispensing chamber 203 extends up to and is sealed to the upper wall structure 215 of said measuring and dispensing chamber 203. In this embodiment the aperture or "bleed-hole" 225 is similarly formed in the rear wall 211 of the measuring and dispensing chamber 210 and provides fluid communication between the interior of the measuring and dispensing chamber 203 and tube 216. The principal difference between the embodiments shown in FIG. 12 on the one hand and this modification is the spacing between the measuring and dispensing chamber 203 and the reservoir chamber 202 with the tube 216 therebetween.

Figure 16:
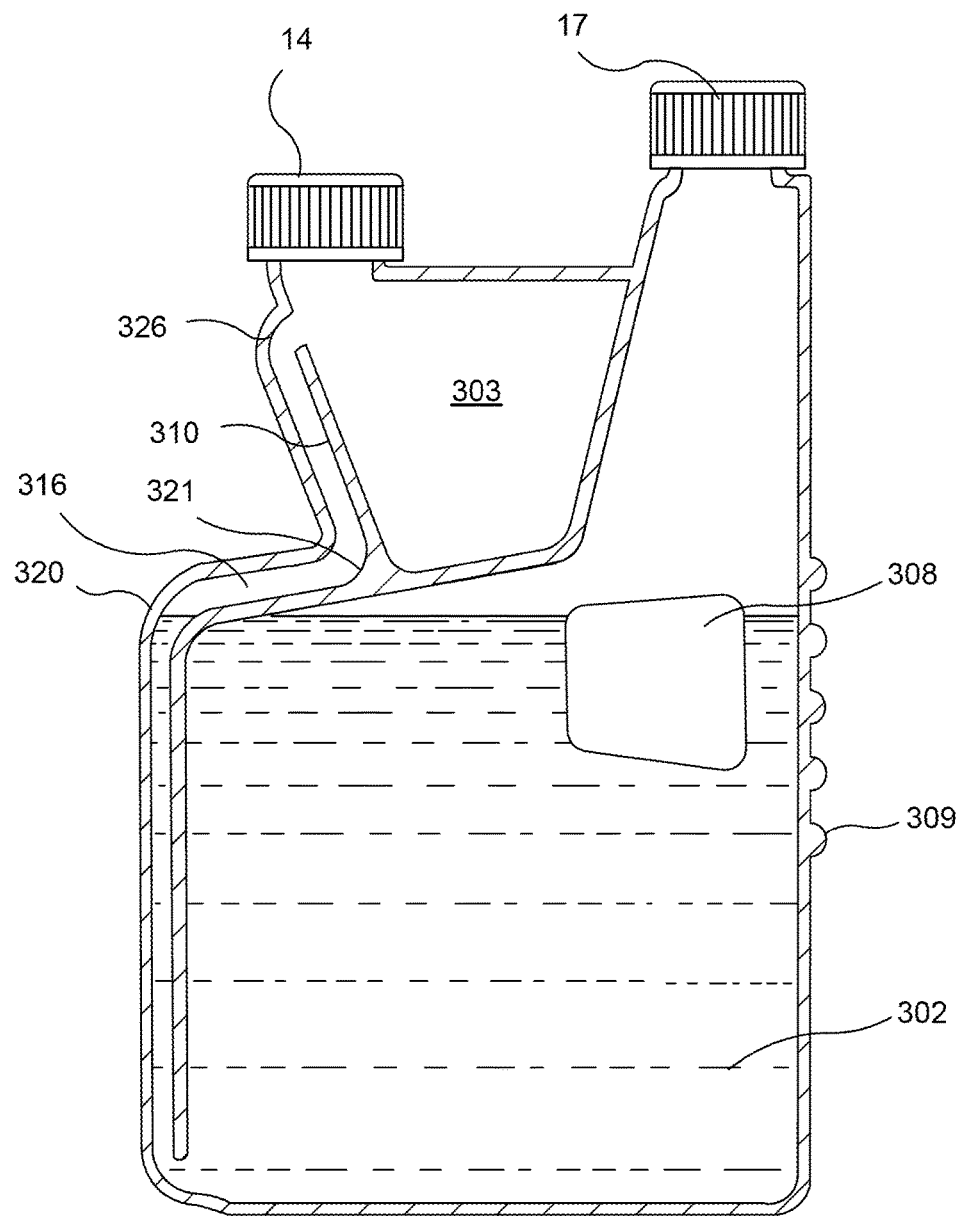
FIG. 16 is a sectional view of a seventh embodiment wherein the conduit from the reservoir chamber to the measuring and dispensing chamber runs along the front wall of the container.

A further embodiment is shown in FIG. 16, with a different configuration in which the tube 316 again is angled twice to present first and second bends 320 and 321. In this particular configuration, however, that section of the tube between the first and second bends 320, 321 does not pass below the measuring and dispensing chamber 303 and, instead of extending upwardly and rearwardly along the rear wall of the measuring and dispensing chamber, extends upwardly and forwardly along the front wall 310 to enter, at its uppermost end, into the upper region of the measuring and dispensing chamber 303. Although FIG. 13 shows the tube 316 located externally up and along the front wall 306 of the reservoir chamber, it could alternatively be molded within the reservoir chamber in the manner of the embodiment shown in FIG. 10. A similar arrangement of the conduit could be used for the containers of the present invention as long as means such as a baffle or the orientation of the outlet from the conduit into the measuring and dispensing chamber are provided to cause liquid entering the measuring and dispensing chamber to flow down one of the walls thereof.

Again, a graduated scale is utilized in conjunction with transparent or translucent walls to permit a visual observation of the amount of liquid which has entered the measuring and dispensing chamber and to enable that amount of liquid to be adjusted to achieve the desired predetermined amount. Although the liquid will flow over the opening through which liquid has entered the measuring and dispensing chamber from the tube 316, it will not flow back into the reservoir by virtue of the angle created by the second bend 321 which, effectively, creates a trap 330 which prevents either surplus liquid from the reservoir escaping the vacuum created by the tightened cap 317 to enter the measuring and dispensing chamber or any liquid which has entered the tube 316 through the opening into the measuring and dispensing chamber from returning to the reservoir. In fact, the angled wall portion 326 ensures that, upon appropriate forward tilting of the container, any such liquid which entered the tube will be poured out of the tube and through the open neck.

In the above-described embodiments, the bends (angles) in the tube control the level of liquid in the tube and thereby prevent uncontrolled entry of liquid into the measuring and dispensing chamber when the container is tilted to pour a measured amount of liquid from the measuring and dispensing chamber.

In all of these embodiments, the reservoir chamber (2, 102, 202, 302) is filled with liquid through the filling passage (18, 118, 218, 318) which is sealingly closeable at its top by a filling cap (17, 117, 217, 317). Caps for both the dispensing outlet (14, 114, 214, 314) and the filling passage (17, 117, 217, 317) may be internally threaded to mate with external screw threads on upstanding necks from the measuring and dispensing chamber and from the reservoir chamber respectively. Reliable hermetic sealing between the cooperating caps and necks can be effected by an O-ring or similar gasket structure not shown. These are, of course, examples only of releasably sealable cap components.

Containers according to the present invention are typically made by molding polymeric materials such as, high density polyethylene (HDPE), polypropylene, blow-moldable nylons and polyethylene terephthallate (PET). The precise nature of the material used may vary depending on the intended contents.

Containers according to the present invention may be produced by a variety of methods including blow molding techniques such as continuous extrusion blow molding, accelerator head blow molding, reciprocating screw blow molding, thermoforming and injection molding. In the latter case, parts of the container may be made separately and then sealed together, for example by sonic sealing.

The mode of operation of the invention will now be described. The filling cap 17 is removed, whereupon liquid is poured through the neck exposed by the removed filling cap 17 through the filling passage 10 into the main body of the reservoir chamber. During this filling step the container is vented, either by air passage through the exposed neck or by loosening the dispensing cap 14. Thereupon, the filling cap 17 is replaced on its neck and both caps 14 and 17 are tightened to provide secure and hermetic seals.

When it is desired to measure a precise and predetermined amount of the liquid, the dispensing cap 14 is loosened but the filling cap 17 remains in its tightened state. The body of the reservoir chamber 2 is then squeezed and the flexible side walls 4 permit liquid to be forced from the reservoir chamber 2 upwardly and through the tube 16 to enter the measuring and dispensing chamber 3 through the passage 23 and down the rear wall 11 of the measuring and dispensing chamber 3. The squeezing of the flexible walls of the reservoir chamber is discontinued when the predetermined desired amount of the liquid has entered the measuring and dispensing chamber. One way to indicate the desired amount is to provide a graduated scale on a wall portion of the measuring and dispensing scale. Such a scale 24 is shown in FIG. 1 of the drawings and, with such scale, the container is molded from transparent or translucent plastics material whereby the level of liquid in the measuring and dispensing chamber can clearly be established with reference to the scale.

When the squeeze pressure on the container wall is released, surplus liquid in the passage 23 and tube 16 will be sucked back into the reservoir chamber by virtue of the vacuum created when the filling cap 17 is tightly sealed and the dispensing cap 14 is loosened. If careful scrutiny of the scale reveals that more liquid is necessary to complete the desired volume, then the container walls are again squeezed to introduce an appropriate amount of additional liquid through the tube 16 into the measuring and dispensing chamber 3. If, on the other hand, there is too much liquid in the measuring and dispensing chamber, the surplus amount can be poured back through the passage 23 by tilting the container 1 in a clockwise direction with reference to the illustration in FIGS. 2 to 4. As the surplus liquid in the passage 23 and tube 16 had been "sucked back" into the reservoir chamber to adopt the liquid level position shown in FIG. 4 of the drawings, the rearward tilting of the container will cause surplus liquid to pass back through the passage 23 and down through the tube 16.

In order to dispense this measured amount of liquid, the dispensing cap 14 is then removed, the filling cap 17 remaining tightly sealed, and the container is grasped by the handle and tilted in a counter-clockwise direction so that all liquid in the measuring and dispensing chamber will be dispensed but no additional liquid will enter the measuring and dispensing chamber.

The rigidity of the handle portion prevents the reservoir chamber from being squeezed during this operation and thereby prevents transfer of additional liquid into the measuring and dispensing chamber.

In the embodiments where there are bends in the conduit leading from the reservoir chamber to the measuring and dispensing chamber, with the filling cap 17 tightly sealed when the container is tilted to pour the measured quantity of liquid from the measuring and dispensing chamber 3, liquid in the tube 16 can rise only to a level between the first 20 and second 21 bends and cannot enter the measuring and dispensing chamber 3. The first and second bends 20, 21 thus provide a trap to prevent unwanted flow of the liquid.

Once the desired amount of the liquid has been dispensed, the dispensing cap 14 may be replaced to seal the dispensing outlet 13 and either the container can be stored with the remaining liquid in it or the dispensing cap 14 can be loosened and process repeated to measure and dispense a second amount of liquid.

The invention claimed is:

1. In a measuring and dispensing container comprising a reservoir chamber, a measuring chamber and a conduit for transferring liquid from the reservoir chamber to the measuring chamber, wherein the reservoir chamber has flexible walls such that squeezing of the flexible walls of the reservoir chamber forces liquid within the reservoir chamber through the conduit and into the measuring chamber, wherein the measuring chamber comprises a pouring opening through which liquid forced into the measuring chamber from the reservoir chamber can be dispensed by tilting the container, the improvement wherein the reservoir chamber comprises means for forming a handle portion defining an opening within the flexible walls of the reservoir chamber such that liquid can flow within the reservoir chamber between a surface of the handle portion bordering the opening and a rear wall of the reservoir chamber that is distal to the measuring chamber and such that the handle portion is more rigid than other portions of the flexible walls and sufficiently rigid to enable the container to be lifted and tilted using the handle portion to dispense liquid from the measuring chamber without forcing additional liquid from the reservoir chamber into the measuring chamber.

2. A measuring and dispensing container as claimed in claim 1, wherein a surface of the measuring chamber contains measurement markings.

3. A measuring and dispensing container as claimed in claim 1, wherein the handle portion comprises ridges on a portion of the rear wall of the reservoir chamber.

4. A measuring and dispensing container as claimed in claim 1, wherein the means for forming the handle portion defines the opening such that it is trapezoidal in shape with a longer side of the trapezoid being located in the front wall of the reservoir chamber adjacent to the measuring and dispensing chamber.

5. A method of measuring and dispensing a predetermined quantity of liquid, said method including the steps of providing the measuring container of claim 4, pouring liquid into said reservoir chamber, sealing said reservoir chamber, venting and then sealing said measuring chamber, squeezing said flexible reservoir chamber to force liquid from said reservoir chamber through said conduit into said measuring chamber until a predetermined quantity has entered said measuring chamber, opening said measuring chamber and then grasping the handle and tilting said container to dispense the measured amount of liquid from the measuring chamber.

6. A measuring and dispensing container as claimed in claim 1, wherein said reservoir chamber is narrower at the top than at the bottom.

7. A measuring and dispensing chamber as claimed in claim 6 wherein the width of the reservoir chamber narrows at a location proximate to the recess in which the handle portion is located.

8. A measuring and dispensing container as claimed in claim 7, wherein at least one wall of the measuring chamber bears measurement markings indicating the amount of liquid transferred to the measurement and dispensing chamber.

9. A measuring and dispensing container as claimed in claim 1, wherein the measuring chamber has front and rear walls that taper towards each other towards each other as they descend.

10. A measuring and dispensing container as claimed in claim 1, wherein the measuring chamber has a rounded front wall and a shape of a cone split along its longitudinal axis.

11. A measuring and dispensing container as claimed in claim 1, wherein the measuring chamber is located above part of the reservoir chamber.

12. A measuring and dispensing container as claimed in claim 1, wherein the conduit from the reservoir chamber to the measuring chamber runs from a location proximate to the bottom of the reservoir chamber to a location proximate the top of one of the walls of the measuring chamber.

13. A measuring and dispensing container as claimed in claim 1, wherein the conduit leading from the reservoir chamber to the measuring chamber is disposed such that liquid being transferred from the reservoir chamber to the measuring chamber enters said chamber pointed in a downward direction.

14. A measuring and dispensing container as claimed in claim 13 wherein the container is constructed and arranged such that liquid entering the measuring chamber is directed to run down a wall of the measuring chamber.

15. A measuring and dispensing container as claimed in claim 1, wherein the conduit from the reservoir chamber to the measuring chamber has an outlet constructed and arranged such that it directs outgoing liquid against a wall or baffle of the measuring chamber adjacent to the outlet.

16. A measuring and dispensing container as claimed in claim 1, wherein the front wall of the measuring chamber is set at an angle to the vertical.

17. A measuring and dispensing container as claimed in claim 1, wherein the conduit bringing liquid from the reservoir chamber to the measuring chamber comprises at least two bends at spaced intervals along the conduit.

18. A measuring and dispensing container as claimed in claim 1, wherein the conduit is constructed and arranged for bringing liquid from the reservoir chamber to the measuring chamber at a level below a top of the walls of the measuring chamber such that liquid flows back from the measuring chamber into the reservoir chamber if more than a predetermined amount of liquid is transferred to the measuring chamber.

19. A measuring and dispensing container as claimed in claim 1, wherein the conduit is located internally within the reservoir chamber.

20. A measuring and dispensing container as claimed in claim 1, wherein the conduit is located externally of the reservoir chamber.

21. A measuring and dispensing container as claimed in claim 1, wherein the reservoir chamber, the conduit and the measuring chamber comprise an integrally molded unit.

22. A measuring and dispensing container as claimed in claim 1, wherein the reservoir chamber, the conduit and the measuring chamber are an integral unit formed by compression molding, wherein said reservoir chamber is disposed below said measuring chamber and said conduit is spaced from said chambers by webs formed by said compression molding.

23. A measuring and dispensing container as claimed in claim 1, further comprising a filling passage extending into said reservoir chamber, a filling cap for closing the filling passage, a dispensing outlet extending from said measuring chamber and a dispensing cap for closing the dispensing outlet.

24. A measuring a dispensing container as claimed in claim 23, wherein a forward wall of the measuring chamber is angled upwardly and forwardly from a bottom of the measuring chamber and wherein the dispensing outlet has an axis that lies in a plane substantially parallel to a plane of the upwardly angled forward wall of the measuring chamber.

25. The measuring and dispensing container as claimed in claim 1, wherein the means comprises reinforcing knobs or ridges on an outside surface of an intermediate portion of a rear wall of the reservoir chamber.

26. The measuring and dispensing container as claimed in claim 1, wherein the means comprises providing walls of the handle portion with increased thickness as compared with a thickness of other walls of the reservoir chamber.

27. The measuring and dispensing container as claimed in claim 1, wherein a front wall of the reservoir chamber is disposed proximal to the measuring chamber and the rear wall of the reservoir chamber is disposed distal to the measuring chamber.

28. A method of measuring and dispensing a predetermined quantity of liquid, said method comprising the steps of providing the measuring and dispensing container of claim 1, pouring liquid into said reservoir chamber, sealing said reservoir chamber, venting and then sealing said measuring chamber, squeezing said flexible reservoir chamber to force liquid from said reservoir chamber through said conduit into said measuring chamber until a predetermined quantity of the liquid has entered said measuring chamber, opening said measuring chamber and then grasping the handle portion and tilting said container to dispense the measured amount of liquid from the measuring chamber.

* * * * *